(12) United States Patent
Odisho et al.

(10) Patent No.: US 10,491,701 B2
(45) Date of Patent: Nov. 26, 2019

(54) INTERCONNECT METHOD FOR IMPLEMENTING SCALE-UP SERVERS

(71) Applicant: CISCO TECHNOLOGY, INC., San Jose, CA (US)

(72) Inventors: Victor Odisho, San Jose, CA (US); Bidyut Kanti Sen, Milpitas, CA (US); Jayaprakash Balachandran, Fremont, CA (US); Michael Leung, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 120 days.

(21) Appl. No.: 15/210,722

(22) Filed: Jul. 14, 2016

(65) Prior Publication Data
US 2018/0019953 A1    Jan. 18, 2018

(51) Int. Cl.
H04L 29/08    (2006.01)

(52) U.S. Cl.
CPC ...... H04L 67/2842 (2013.01); H04L 67/1095 (2013.01)

(58) Field of Classification Search
CPC  H04L 47/805; H04L 67/1095; H04L 67/2842
USPC ........................................................ 709/226
See application file for complete search history.

(56) References Cited

U.S. PATENT DOCUMENTS

| | | | | |
|---|---|---|---|---|
| 7,802,017 B2* | 9/2010 | Uemura | ..................... | G06F 1/26 370/252 |
| 7,840,675 B2* | 11/2010 | Ishiki | ................ | G06F 15/17337 709/220 |
| 8,260,923 B2* | 9/2012 | Shinohe | ................ | G06F 9/5083 709/203 |
| 9,594,716 B1* | 3/2017 | Nair | ..................... | G06F 13/4068 |
| 9,785,203 B1* | 10/2017 | Maroney | ................. | G06F 1/181 |
| 2006/0161718 A1* | 7/2006 | Berke | ................ | G06F 13/4022 710/317 |
| 2009/0109615 A1 | 4/2009 | Potter et al. | | |

(Continued)

OTHER PUBLICATIONS

Kottapalli, S., et al., "Nehalem-EX CPU Architecture," Intel, Hot Chips 2009, Sep. 10, 2009, 19 pages; http://www.hotchips.org/wp-content/uploads/hc_archives/hc21/2_mon/HC21.24.100.ServerSystemsl-Epub/HC21.24.122-Kottapalli-Intel-NHM-EX.pdf.

(Continued)

*Primary Examiner* — Nicholas R Taylor
*Assistant Examiner* — Chong G Kim
(74) *Attorney, Agent, or Firm* — Polsinelli PC (57) ABSTRACT

An embodiment includes a first server including a first processor electrically connected to a second processor; a second server including a third processor electrically connected to a fourth processor; a first connection plane, wherein one of the first and second processors is connected to one of the third and fourth processors by a first connection via the first connection plane and one of the first and second processors is connected to one of the third and fourth processors by a second connection via the first connection plane; and a second connection plane, wherein one of the first and second processors is connected to one of the third and fourth processors by a third connection via the second connection plane and wherein one of the first and second processors is connected to one of the third and fourth processors by a fourth connection via the second connection plane.

16 Claims, 10 Drawing Sheets

(56) References Cited

U.S. PATENT DOCUMENTS

| | | | | |
|---|---|---|---|---|
| 2010/0315135 | A1* | 12/2010 | Lai | G06F 5/06 327/145 |
| 2011/0016201 | A1* | 1/2011 | Ishiki | G06F 15/17337 709/220 |
| 2011/0125974 | A1 | 5/2011 | Anderson | |
| 2011/0320720 | A1* | 12/2011 | Walters | G06F 12/128 711/122 |
| 2012/0054469 | A1* | 3/2012 | Ikeya | G06F 15/7803 712/29 |
| 2012/0159241 | A1* | 6/2012 | Nishijima | G06F 11/1423 714/11 |
| 2012/0311359 | A1* | 12/2012 | Jaramillo | H04L 25/0298 713/321 |
| 2014/0143368 | A1 | 5/2014 | Anderson | |
| 2014/0344534 | A1* | 11/2014 | Kato | G06F 3/0604 711/154 |
| 2014/0365629 | A1* | 12/2014 | Umezawa | G06F 11/325 709/223 |
| 2015/0363350 | A1* | 12/2015 | Yeung | G06F 13/4221 710/106 |
| 2017/0019105 | A1* | 1/2017 | Xiao | H03K 19/01750 |
| 2017/0019247 | A1* | 1/2017 | Iyer | H04L 25/20 |

OTHER PUBLICATIONS

"SPARC T5 Processor," Oracle Corporation, Copyright © 2013, Published on or about Jul. 18, 2013;3 pages http://www.oracle.com/us/products/servers-storage/servers/sparc/oracle-sparc/t5-processor-ds-1922863.pdf.

"Intel QuickPath Architecture," White Paper, Intel Corporation, Published on or about Aug. 24, 2009, 6 pages; http://www.intel.com/pressroom/archive/reference/whitepaper_QuickPath.pdf.

* cited by examiner

INTERCONNECT METHOD FOR IMPLEMENTING SCALE-UP SERVERS

TECHNICAL FIELD

This disclosure relates in general to the field of computer devices and, more particularly, to interconnect methods for implementing scale-up servers in the field of computer devices.

BACKGROUND

Every data center uses servers to provide computing resources (e.g., processing, memory space, network and disk I/O, etc.) that workloads need to function. As workloads proliferate and computing demands increase, server resources need to be expanded, or "scaled" to meet the increasing demands. There are two ways to scale server resources in a data center. The first is to add more servers or "scale-out." For example, assume an enterprise has a virtual server running five applications and using 80% of the physical server's computing capacity. If the enterprise needs to deploy more workloads and the physical server lacks sufficient computing capacity to support the additional workloads, the enterprise may need to deploy an additional server to support the new workloads. Scale-out architecture also refers to clustered or disturbed computing approaches in which multiple small servers share the computing load for a single application. For example, a mission-critical workload may be deployed on two or more servers, with the processing being shard across those servers such that if one server fails, the other can take over and maintain the application's availability. The cluster can be scaled out with additional server nodes if more redundancy is needed.

Advances in technology, as well as server computing power, have increased the amount of resources that may be provided by a single server. Today's servers have far more processing, memory, and I/O capability than previous models within a similarly sized chassis. This approach is referred to as "scale-up" because the physical server can handle more and/or larger workloads. Referring again to the example set forth above, using a scale-up approach, it is possible to deploy a new server in the next technology refresh cycle with far more computing resources, migrate all of the workloads from the old server to the new one, take the old server out of service or allocate it to other tasks and be left with significantly more available resources to tackle additional production workloads without adding significantly to data center space or energy requirements.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS

Overview

An apparatus is provided in one embodiment and includes a first server including a first processor electrically connected to a second processor; a second server including a third processor electrically connected to a fourth processor; a first connection plane, wherein one of the first and second processors is connected to one of the third and fourth processors by a first connection via the first connection plane and one of the first and second processors is connected to one of the third and fourth processors by a second connection via the first connection plane; a second connection plane, wherein one of the first and second processors is connected to one of the third and fourth processors by a third connection via the second connection plane and wherein one of the first and second processors is connected to one of the third and fourth processors by a fourth connection via the second connection plane; in which each of the processors of each one of the servers is connected to each of the processors of the other one of the servers.

In certain embodiments, at least one of the first, second, third, and fourth connections is implemented as a cache-coherent link. In additional embodiments, each of the first, second, third, and fourth connections is implemented as a cache-coherent link. In some embodiments, the first connection plane is a frontplane and the second connection plane is a midplane or a backplane. A plurality of electrical redrivers may be disposed on each of the first and second connection planes, in which at least one of the first, second, third, and forth connections is made via at least one of the red rivers. Each the first and second servers may be implemented as a blade server.

In at least one embodiment, the first connection is disposed between the first and third computers, the second connection is disposed between the first and fourth processors, the third connection is disposed between the second and third processors, and the fourth connection is disposed between the second and fourth processors. In an alternative embodiment, the first connection is disposed between the first and third computers, the second connection is disposed between the second and fourth processors, the third connection is disposed between the second and third processors, and the fourth connection is disposed between the first and fourth processors.

Example Embodiments

As previously noted, there are two primary types of server implementations used in data centers; namely, scale-up and scale-out. Both types of servers use multiple processors. In scale-up servers, the processors are interconnected via cache-coherent links and all work together under a single operating system software. This manner of connecting multiple processors together may also be called Symmetric Multi-Processing ("SMP") and the cache-coherent links may be referred to as SMP links. Scale-up servers are typically (but not always) used in applications in high performance databases, analytics, and compute servers. Scale-out servers, on the other hand, do not use cache-coherent links between processors and each processor subsystem works as an independent server with its own operating system software.

Implementation of scale-up servers is particularly challenging. The cache-coherent links between any two processors require a very high bandwidth (data rate) interconnect. These interconnects are realized by multiple high speed Serializer/Deserializer ("SERDES") lanes in parallel as a bundle, which is referred to as a "port." A SERDES is a pair of functional blocks often used in high speed communications to compensate for limited I/O. The SERDES blocks convert data between serial and parallel interfaces in each direction. The primary purpose of a SERDES is to provide data transmission over a single/differential line to minimize the number of I/O pins and interconnects. The SERDES function comprises two functional blocks, including a Parallel-In, Serial-Out ("PISO") block (also known as a parallel-to-serial converter), and a Serial-In, Parallel-Out ("SIPO") block (also known as a serial-to-parallel converter). The PISO block may include a parallel clock input, a set of data input lines, and input data latches. An internal or external phase-locked loop ("PLL") may be used to multiply the incoming parallel clock up to the serial frequency. The simplest form of the PISO has a single shift register that receives the parallel data once per parallel clock and shifts it out at the higher serial clock rate. The SIPO block may include a receive clock output, a set of data output lines, and output data latches. The receive clock may be recovered from the data using a serial clock recovery technique. SERDES that do not transmit a clock use a reference clock to lock the PLL to the correct TX frequency, avoiding low harmonic frequencies that may be present in the data stream. The SIP block divides the incoming clock down to the parallel rate. Typical implementations have two registers connected as a double buffer. In such implementations, one register is used to clock in the serial stream and the other is used to hold the data for the slower, parallel side.

A typical implementation may employ 20 or more SERDES lanes per port. For bidirectional communications, there may be a transmit port ("TX port") and a receive port ("RX port"). Since a scale-up system includes multiple processors, there would be multiple TX/RX port pairs per processor with each port in turn having multiple high speed SERDES lanes. This creates an enormous interconnect challenge in the system. Embodiments described herein address this interconnect challenge in designing modular scale-up server systems. In particular, embodiments described herein employ 2-way Symmetric Multiprocessor ("SMP") system implementation as a building block to realize 4-way and 8-way (and beyond) SMP systems. An SMP system is a multiprocessor system with a centralized shared memory, designated "main memory," operating under a single operating system with two or more homogenous processors.

Figure 1:
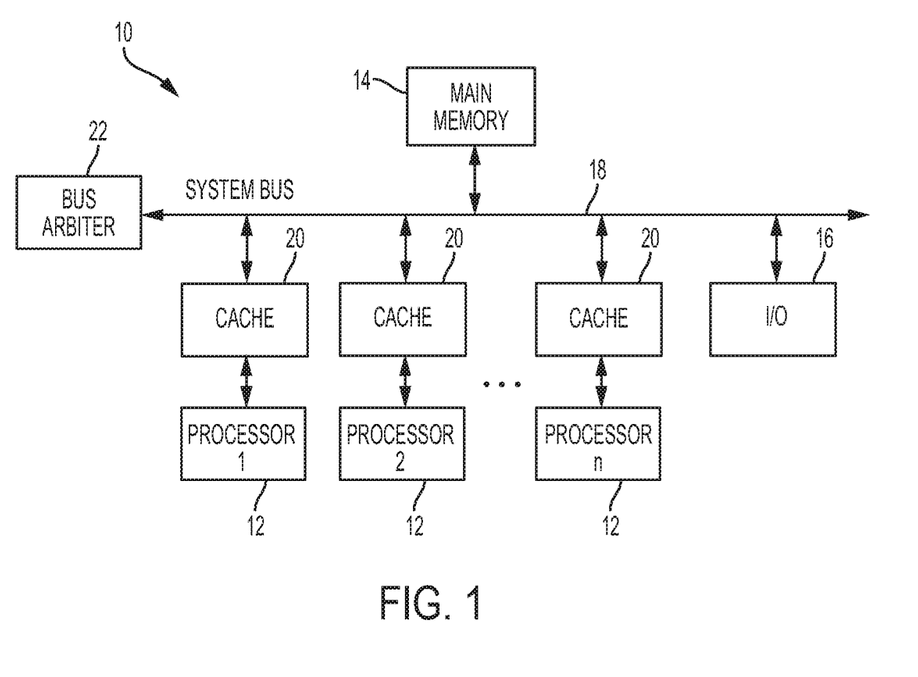
FIG. 1 is a simplified block diagram of an example Symmetric Multi-Processing ("SMP") system such as may be deployed in embodiments described herein.

FIG. 1 illustrates a simplified block diagram of an example conventional SMP system 10. As shown in FIG. 1, an SMP system, such as the SMP system 10, is a tightly coupled multiprocessor system with a pool of homogenous processors 12 running independently, each executing different programs on different data, with the ability to share resources, such as main memory 14 and I/O 16, and connected via a system bus or crossbar 18. Each processor 12 typically has associated therewith a private high speed cache memory 20 to speed up the main memory data access and reduce system bus traffic. A bus arbiter 22 is provided for arbitrating access to the system bus 18 by processors 12.

Figure 2:
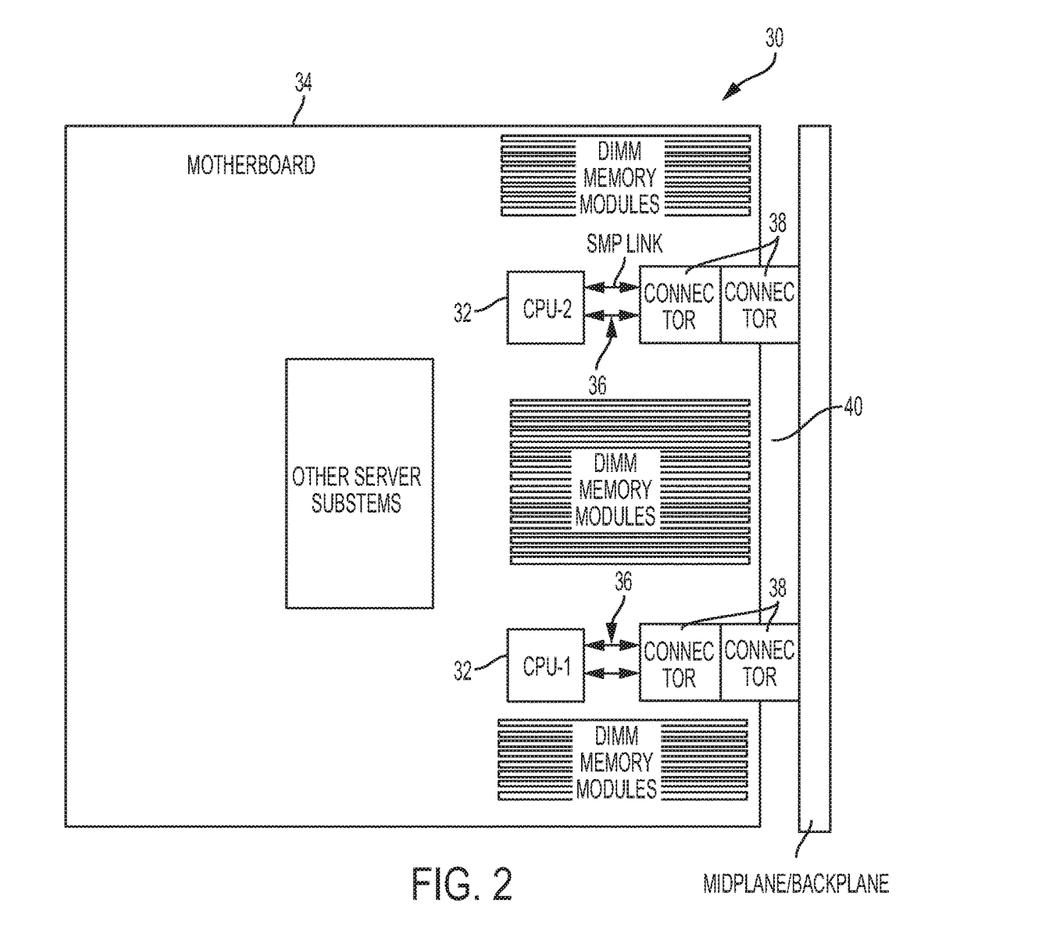
FIG. 2 is simplified block diagram illustrating a conventional arrangement of a 2-way SMP system including two processors disposed on a wide motherboard.

In accordance with features of embodiments described herein, a 2-way SMP system implementation uses only half the width of the traditional 2-way system used to realize 4-way and 8-way systems. In certain embodiments, such a half-width 2-way SMP system is realized by placing the processors one behind another along the length of the printed circuit board (known as shadow core placement). As illustrated in FIG. 2, a conventional, or traditional, 2-way SMP system 30 includes two processors, or CPUs, 32 disposed on a wide motherboard 34. Each CPU 32 includes a plurality of cache-coherent SMP links 36, all of which connect to respective connectors 38 disposed on a midplane or backplane, collectively designated in FIG. 2 by a reference numeral 40, of the server system 30. As will be described in greater detail hereinbelow, the approach illustrated in FIG. 2 requires a motherboard having twice as much width as that of a half width SMP implementation described herein. The system 30 is not configurable for 4- and 8-way SMP implementations; therefore, separate mother board designs are required for 2, 4 and 8 way SMP implementations.

In certain embodiments described herein, the cache-coherent links are split such that half of them go to the midplane (or backplane) and the other half go to the front plane disposed on the front side of the system chassis. This approach requires only smaller size connectors be used at the front side and back side, thereby enabling good air flow and regulating operating temperature of the processors and its subsystems. This arrangement also significantly reduces wiring density requirement such that the SMP links may be routed in fewer layers of printed circuit board as opposed to implementations in which all cache-coherent links are brought to front or back side. This arrangement is illustrated in FIG. 3, which illustrates a 4-way SMP system 50 in accordance with features of embodiments described herein for interconnect methods for implementing scale-up servers.

Figure 3:
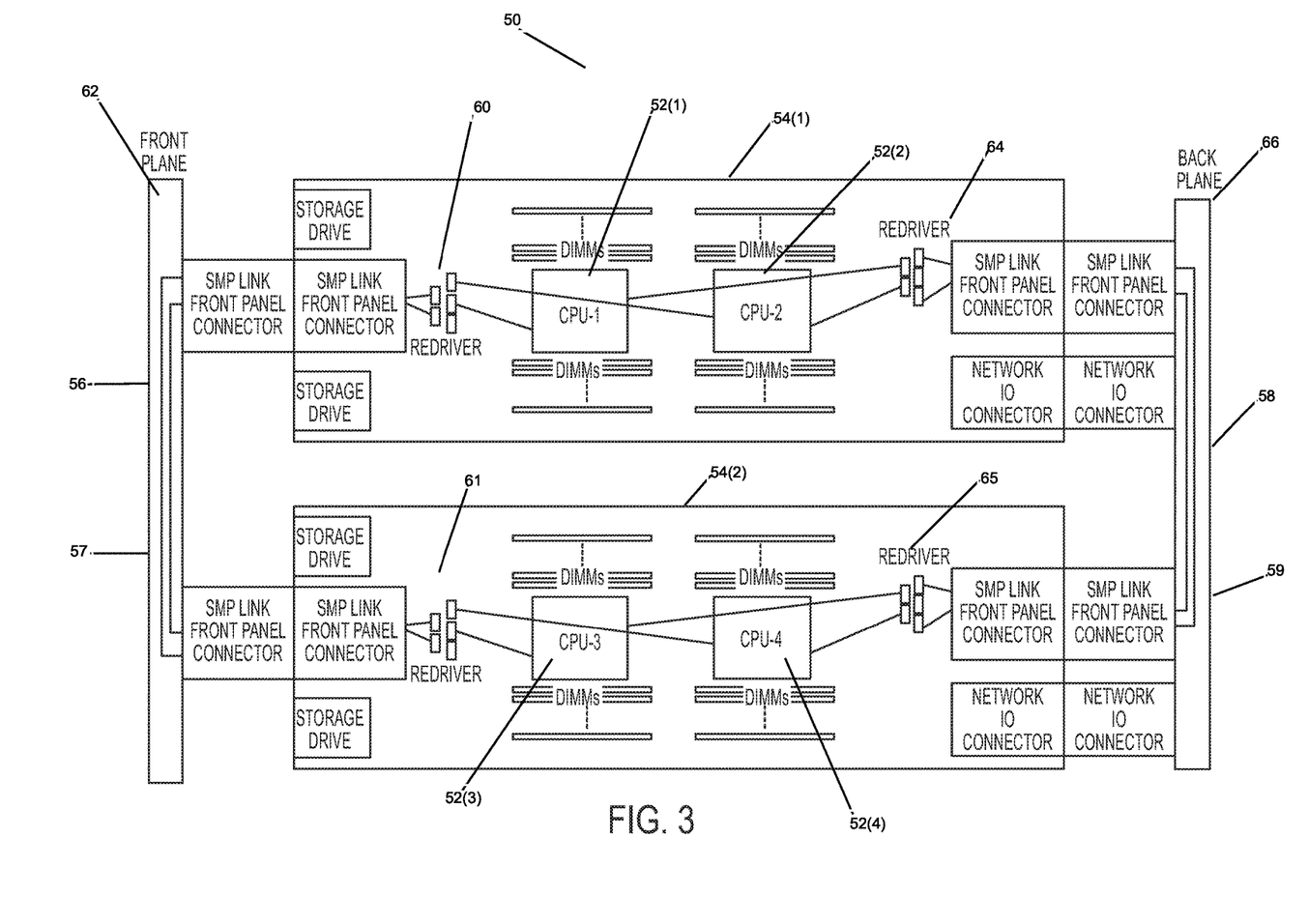
FIG. 3 is a simplified block diagram illustrating an arrangement of a 4-way SMP system in accordance with features of embodiments described herein for interconnect methods for implementing scale-up servers.

As shown in FIG. 3, the SMP system 50 includes four CPUs 52(1)-52(4), two of which (i.e., CPU 52(1) and 52(2)) are disposed on a first motherboard 54(1) and two of which (i.e., 52(3) and 52(4)) are disposed on a second identical motherboard 54(2). Each of CPUs 52(1)-52(4) has a plurality of cache-coherent links 56-59 that interconnect each of the CPUs to another one of the CPUs. In accordance with features of embodiments described herein, half of the cache-coherent links in the system (i.e., link 56 connecting CPUs 52(1) and 52(4) and link 57 connecting CPUs 52(2) and 52(3)) are connected to protocol agnostic electrical redrivers 60, 61, on a front plane 62 of the system 50 chassis and the other half of the cache-coherent links (e.g., cache-coherent link 58 connecting CPU 52(2) and CPU 52(4) and cache-coherent link 59 connecting CPU 52(1) and 52(3)) are connected to redrivers 64, 65, on a backplane (or midplane) 66 of the system 50 chassis. In some implementations, protocol agnostic electrical redrivers may not be required, in which case the cache coherent links will be connected directly to the connectors. As a result, and in accordance with features of embodiments described herein, a width of each of the motherboards 54(1) and 54(2) is half that of the motherboard 34 (FIG. 2). It will be recognized that each of the motherboards 54(1), 54(2), may correspond to a blade server, or "blade."

The cache-coherent links that connect to the front plane (e.g., links 58 and 59) and those that connect to the backplane (56 and 57) are carefully selected such that the system may be easily reconfigured for 4-way and 8-way SMP implementations with a maximum distance of one hop between processors. The cache-coherent links that connect to the front side and back side tend to be longer and hence incur high signal losses causing signal integrity issues. To avoid signal integrity issues, protocol agnostic broadband electrical signal amplifiers, or redrivers (such as redrivers 60, 61, 64, 65), may be deployed to compensate for losses resulting from long lengths of interconnect media. Alternatively, certain embodiments may make use of twin axial cable ("twinax") or co-axial cable for connecting the cache-coherent links to the backplane and front/mid-plane without requiring the use of redrivers (PHY layer only). Such twinax or co-axial cables can also be used selectively to the TX/RX ports that incur highest losses, while other TX/RX ports are routed on the printed circuit boards, or motherboards. The cables can attach to the printed circuit boards either through a high density connector or be directly press fitted to the printed circuit board vias. The connectors and/or vias may be oriented in parallel to the direction of air flow to avoid its obstruction.

Normally, the high speed links that connect to the backplane/mid-plane and/or front plane carry cache-coherent SMP data. However, in some scenarios in which multi-way SMP systems are not required, the same high speed links can be used to carry processor I/O traffic (e.g., PCIe data) or network data in order to expand system capabilities such as storage. 4-way and 8-way (and beyond) SMP systems are particularly challenging to implement in smaller form factors that enable higher server density. Embodiments describe herein implement a method of interconnecting SMP links in a modular 2-way processor subsystem, which in turn are used to build 4-way and 8-way systems implemented in compact form factors.

Embodiments described herein enable higher server density than traditional implementations; in particular, up to four 4-way systems and up to two 8-way systems in 6 U form factors, whereas traditional systems require 10 U or higher form factors for a comparable number of comparable systems. Additionally, the system can be easily reconfigured for 2-way, 4-way, and 8-way SMP implementations. Fewer printed circuit board layers are required, thereby lowering costs for the server mother boards, and the subject embodiments enable lower latency and higher performance than node concentrator or multiplexer-based implementations up to 8 S.

Figure 4A:
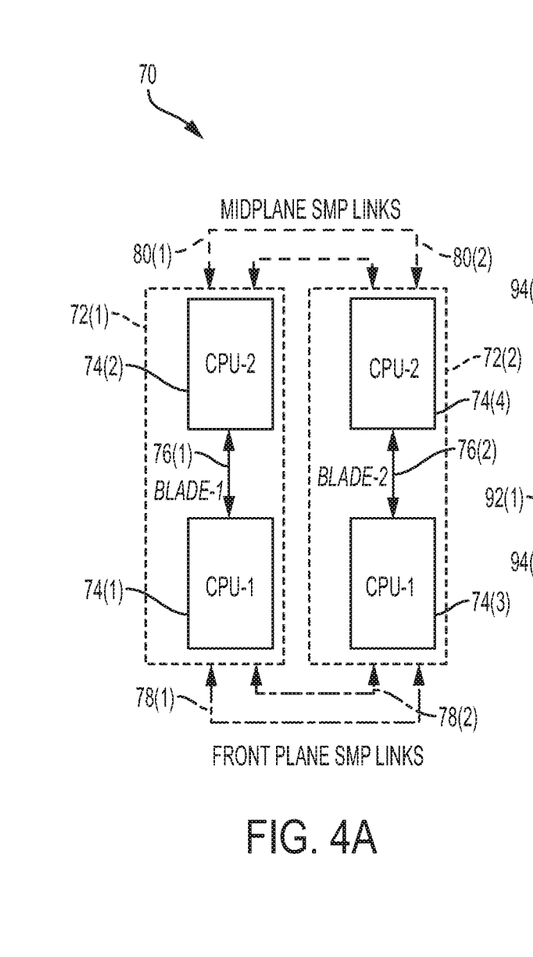
FIG. 4A is a more simplified block diagram illustrating an arrangement of a 4-way SMP system in accordance with features of embodiments described herein for interconnect methods for implementing scale-up servers.
Figure 5A:
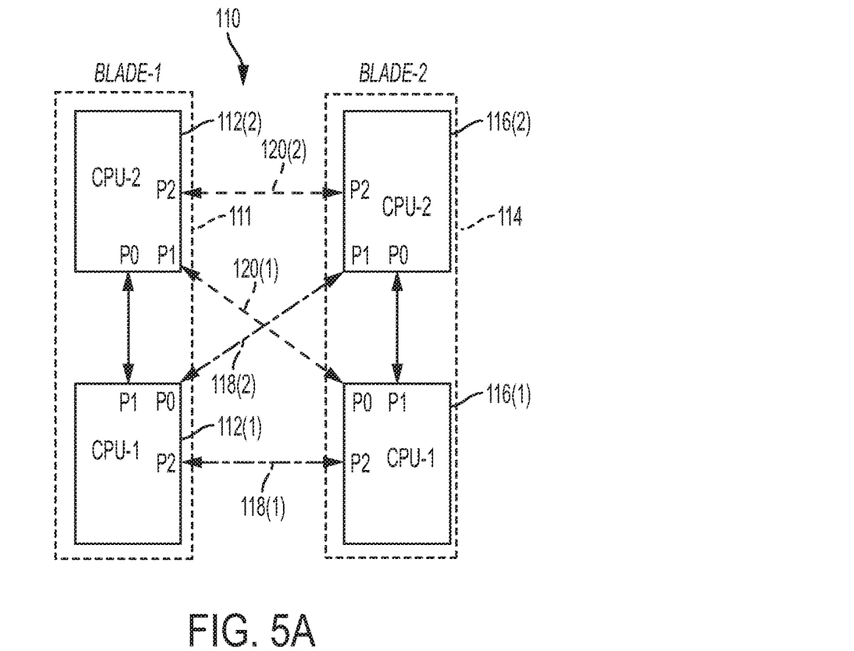
FIG. 5A illustrates a shortest length interconnect arrangement for implementing a 4-way SMP system in accordance with features of embodiments described herein for interconnect methods for implementing scale-up servers.

Referring now to FIG. 4A, illustrated therein is a simplified block diagram of an example 4-way SMP system 70 implemented in accordance with embodiments described herein. As shown in FIG. 5A, the system 70 includes two servers, or "blades," 72(1), 72(2), each of which includes two CPUs 74(1), 74(2), 74(3), and 74(4). The two CPUs on each blade are interconnected via an onboard electrical link. For example, the CPUs 74(1), 74(2), on blade 72(1) are interconnected via an onboard electrical link 76(1) and the CPUs 74(3), 74(4) on blade 72(2) are interconnected via an onboard electrical link 76(2). A total of four cache-coherent (or SMP) links 78(1), 78(2), 80(1), and 80(2), are provided between the blades 72(1), 72(2). In accordance with features of embodiments described herein, half of the links (i.e., links 78(1), 78(2)) are routed to the front plane of the system, while the remaining links (i.e., links 80(1), 80(2) are routed to the backplane (or midplane) of the system.

Figure 4B:
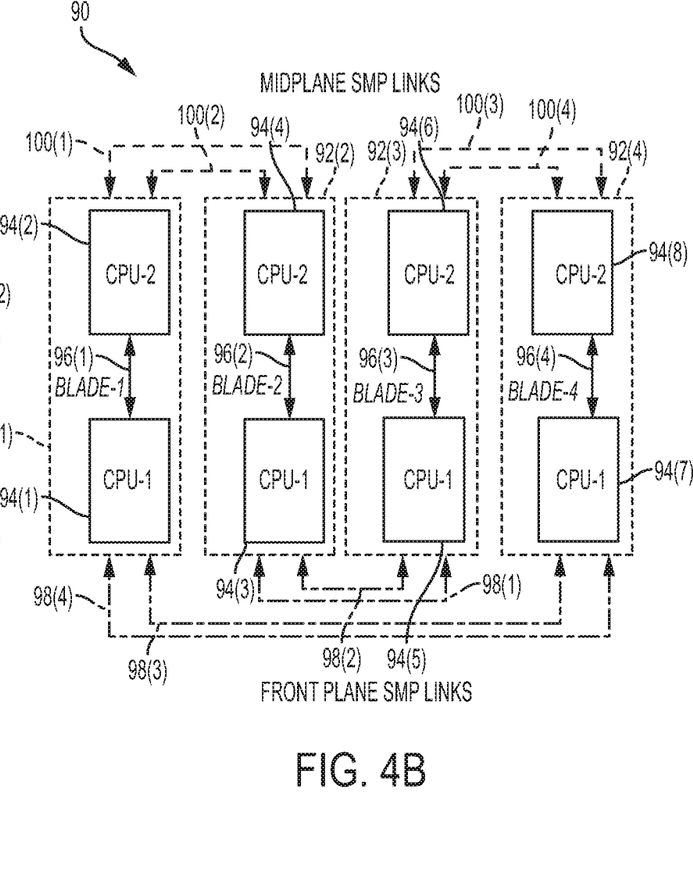
FIG. 4B is a more simplified block diagram illustrating an arrangement of an 8-way SMP system in accordance with features of embodiments described herein for interconnect methods for implementing scale-up servers.

Turning now to FIG. 4B, illustrated therein is a simplified block diagram of an example 8-way SMP system 90 implemented in accordance with embodiments described herein. As shown in FIG. 4B, the system 90 includes four blades 92(1)-92(4), each of which includes two CPUs 94(1)-94(8). The two CPUs on each blade are interconnected via an onboard electrical link. For example, the CPUs 94(1), 94(2), on blade 92(1) are interconnected via an onboard electrical link 96(1), the CPUs 94(3), 94(4) on blade 92(2) are interconnected via an onboard electrical link 96(2), the CPUs 94(5), 94(6), on blade 92(3) are interconnected via an onboard electrical link 96(3), and the CPUs 94(7), 94(8) on blade 92(4) are interconnected via an onboard electrical link 96(4). In the illustrated implementation, two sets of front plane SMP links 98(1), 98(2), are provided between blades 92(2) and 92(3) and two sets of front plane SMP links 98(3), 98(4), are provided between blades 92(1) and 92(4). Similarly, two sets of back- or midplane SMP links 100(1), 100(2), are provided between blades 92(1) and 92(2) and two sets of back- or midplane SMP links 100(3), 100(4), are provided between blades 92(3) and 92(4). As a result, half of the eight SMP links in the system 90 are routed via the front plane (i.e., links 98(1)-98(4)), while the other half are routed via the backplane (i.e., links 100(1)-100(4)).

Figure 5B:
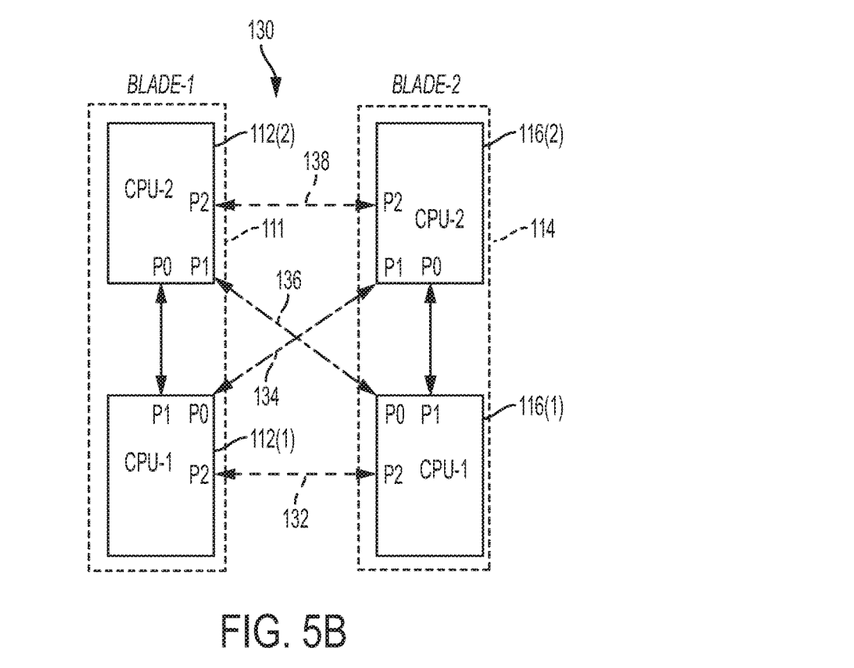
FIG. 5B illustrates an alternative interconnect arrangement for implementing a 4-way SMP system in accordance with features of embodiments described herein for interconnect methods for implementing scale-up servers.
Figure 5C:
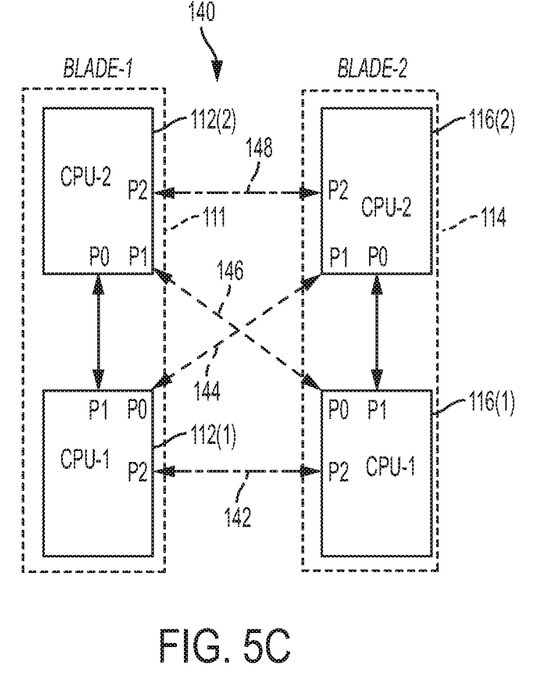
FIG. 5C illustrates a configurable interconnect arrangement for implementing a 4-way SMP system in accordance with features of embodiments described herein for interconnect methods for implementing scale-up servers.

FIGS. 5A-5C respectively illustrate one of three different arrangements for implementing a 4-way SMP system in accordance with features of embodiments described herein for interconnect methods for implementing scale-up servers. Referring to FIG. 5A, illustrated therein is a first arrangement 110 comprising a shortest length interconnect approach. The arrangement 110 comprises a first blade 111 including two CPUs 112(1), 112(2), and a second blade 114 including two CPUs 116(1), 116(2). CPU 112(1) is connected to each of CPUs 116(1) and 116(2) via a front plane SMP link 118(1), 118(2), respectively. Similarly, CPU 112(2) is connected to each of CPUs 116(1) and 116(2) via a backplane SMP link 120(1), 120(2), respectively.

Referring to FIG. 5B, illustrated therein is a second arrangement 130 comprising an alternative interconnect scheme. In the arrangement 130, CPU 112(1) is connected to CPU 116(1) via a backplane SMP link 132 and to CPU 116(2) via a front plane link 134. Similarly, CPU 112(2) is connected to CPU 116(1) via a front plane link 136 and to CPU 116(2) via a backplane link 138.

Figure 6:
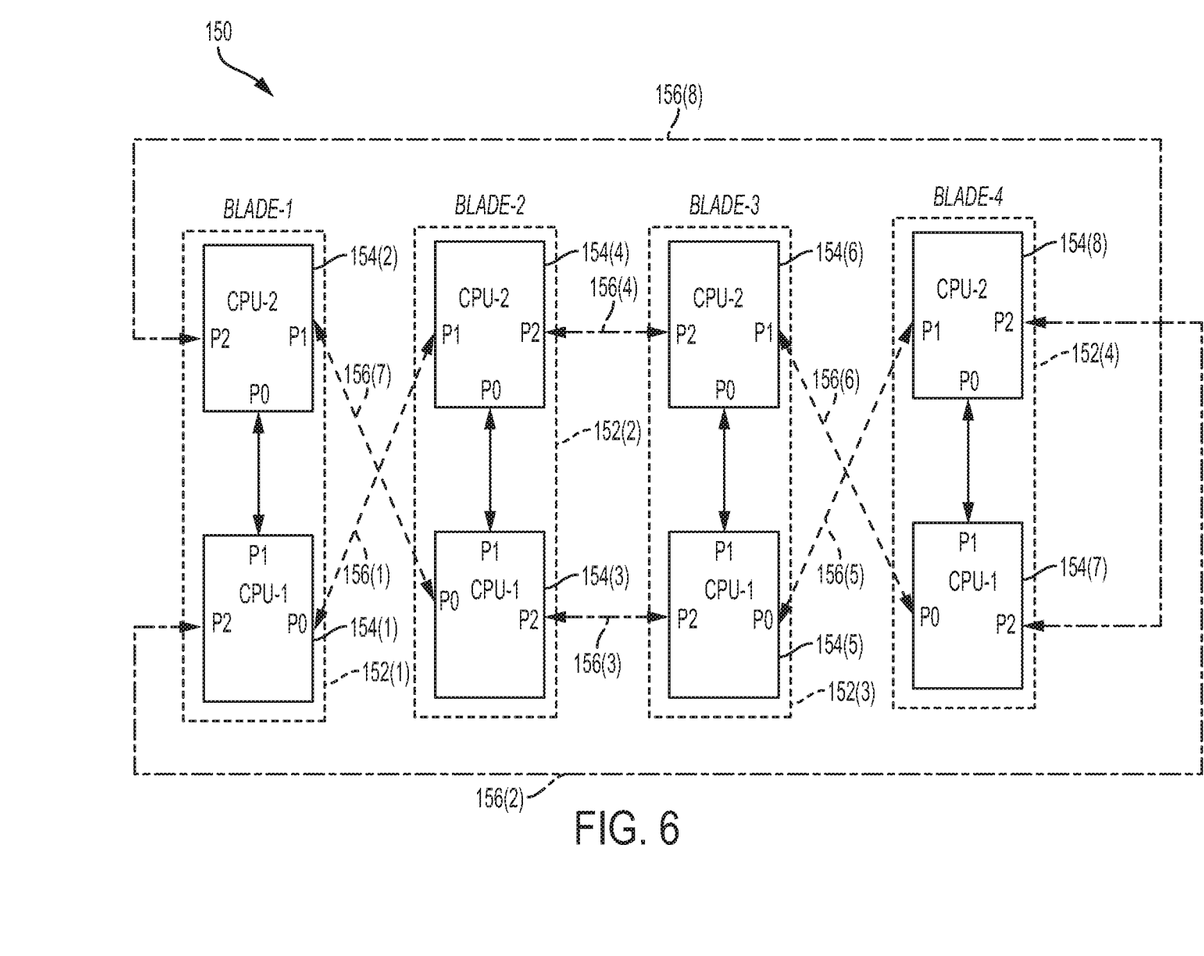
FIG. 6 illustrates a simplified system block diagram of an 8-way SMP system in accordance with features of embodiments described herein for interconnect methods for implementing scale-up servers.

Referring now to FIG. 5C, illustrated therein is a third arrangement 140, which may be reconfigured as an 8-way SMP system as illustrated in FIG. 6. In the arrangement 140, which in some respects is the reverse of the arrangement 130 (FIG. 5B), CPU 112(1) is connected to CPU 116(1) via a front plane SMP link 142 and to CPU 116(2) via a backplane link 144. Similarly, CPU 112(2) is connected to CPU 116(1) via a backplane link 146 and to CPU 116(2) via a front plane link 148. Of the three schemes 110, 130, and 140, the scheme 140 enables realization of both 4-way and 8-way SMP systems using the same two socket building block simply by changing the front panel wiring. An 8-way SMP system may be formed by connecting two 4-way SMP systems, as illustrated below in FIG. 6.

FIG. 6 illustrates a simplified system block diagram of an 8-way SMP system 150 in accordance with features of embodiments described herein for interconnect methods for implementing scale-up servers. As shown in FIG. 6, the system 150 includes four blades 152(1)-154(4) each of which includes two CPUs 154(1)-154(8). CPU 154(1) is connected to CPU 154(4) via a backplane electrical SMP link 156(1) that may include a redriver and to CPU 154(8) via a front plane electrical SMP link 156(2). CPU 154(3) is connected to CPU 154(5) via a front plane electrical SMP link 156(3). CPU 154(4) is connected to CPU 154(6) via a front plane electrical SMP link 156(4). CPU 154(5) is connected to CPU 154(8) via a backplane electrical SMP link 156(5) that may include a redriver. CPU 154(6) is connected to CPU 154(7) via a backplane electrical SMP link 156(6) that includes a redriver. CPU 154(2) is connected to CPU 154(3) via a backplane electrical SMP link 156(7) that includes a redriver and to CPU 154(7) via a front plane electrical SMP link 156(8). Although there are several ways of wiring an 8-way SMP system, the arrangement illustrated in FIG. 6 embodying features described herein is architected to reduce SMP interconnect length between the farthest blades (i.e., blade 1 and blade 4, as shown in FIG. 6) and vice versa, thereby improving performance and signal integrity. In addition, the connections are architected such that all of the SMP links of a given blade connect to only one other blade in a point-to-point fashion. This simplifies mechanical aspect of the front panel cable structures and connectors.

Figure 7A:
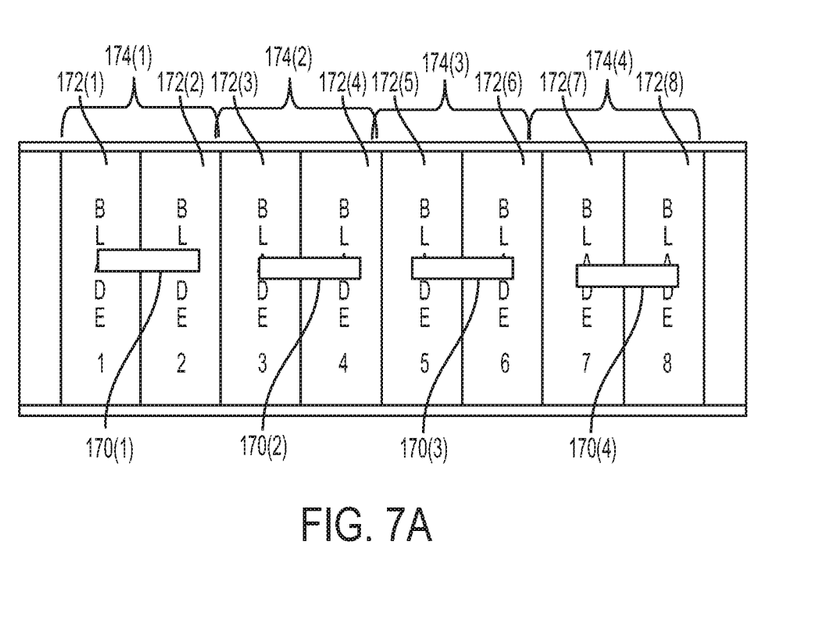
FIG. 7A illustrates example front plane SMP interconnects for implementing eight blade servers as four 4-way SMP servers in a 6U blade chassis in accordance with features of embodiments described herein for interconnect methods for implementing scale-up servers.
Figure 7B:
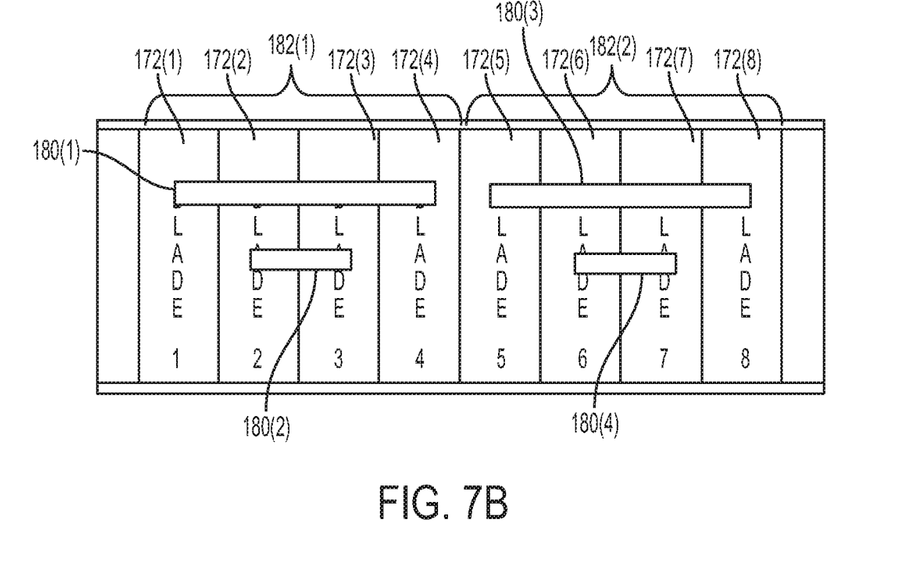
FIG. 7B illustrates example front plane SMP interconnects for implementing eight blade servers as two 8-way SMP servers in accordance with features of embodiments described herein for interconnect methods for implementing scale-up servers.

FIG. 7A illustrates example front plane SMP interconnects 170(1)-170(4) for implementing eight blade servers 172(1)-172(8) as four 4-way SMP servers 174(1)-174(4) in a 6 U blade chassis 178 in accordance with features of embodiments described herein for interconnect methods for implementing scale-up servers. FIG. 7B illustrates front plane SMP interconnects 180(1)-180(4) for implementing the eight blade servers 172(1)-172(8) as two 8-way SMP servers 182(1)-182(2) in accordance with features of embodiments described herein for interconnect methods for implementing scale-up servers.

It will be recognized that the various blades shown in the drawings may be implemented using one or more computer devices comprising software embodied in one or more tangible media for facilitating the activities described herein. The computer devices for implementing the blades may also include a memory device (or memory element) for storing information to be used in achieving the functions as outlined herein. Additionally, the computer devices for implementing the blades may include one or more processors capable of executing software or an algorithm to perform the functions as discussed in this Specification. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, various functions outlined herein may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Figure 8:
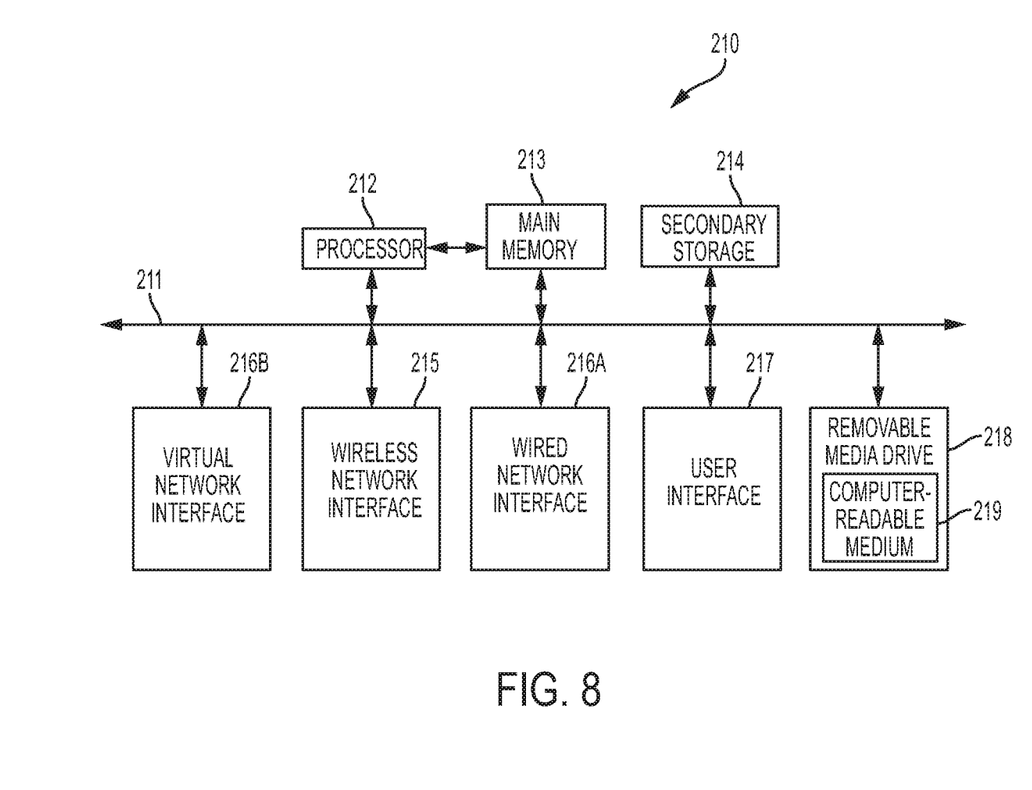
FIG. 8 is a simplified block diagram illustrating components of an example machine capable of executing instructions in a processor in a system for implementing various features of embodiments described herein.

Turning to FIG. 8, illustrated therein is a simplified block diagram of an example machine (or apparatus) 210, which in certain embodiments may comprise one of the blade servers illustrated herein, that may be implemented in embodiments illustrated in and described with reference to the FIGURES provided herein. The example machine 210 corresponds to network elements and computing devices that may be deployed in environments illustrated in described herein. In particular, FIG. 8 illustrates a block diagram representation of an example form of a machine within which software and hardware cause machine 210 to perform any one or more of the activities or operations discussed herein. As shown in FIG. 8, machine 210 may include a processor 212, a main memory 213, secondary storage 214, a wireless network interface 215, a wired network interface 216A, a virtual network interface 216B, a user interface 217, and a removable media drive 218 including a computer-readable medium 219. A bus 211, such as a system bus and a memory bus, may provide electronic communication between processor 212 and the memory, drives, interfaces, and other components of machine 210. Machine 210 may be a physical or a virtual appliance, for example a virtual router running on a hypervisor or running within a container.

Processor 212, which may also be referred to as a central processing unit ("CPU"), can include any general or special-purpose processor capable of executing machine readable instructions and performing operations on data as instructed by the machine readable instructions. Main memory 213 may be directly accessible to processor 212 for accessing machine instructions and may be in the form of random access memory ("RAM") or any type of dynamic storage (e.g., dynamic random access memory ("DRAM")). Secondary storage 214 can be any non-volatile memory such as a hard disk, which is capable of storing electronic data including executable software files. Externally stored electronic data may be provided to computer 210 through one or more removable media drives 218, which may be configured to receive any type of external media such as compact discs ("CDs"), digital video discs ("DVDs"), flash drives, external hard drives, etc.

Wireless, wired, and virtual network interfaces 215, 216A and 216B can be provided to enable electronic communication between machine 210 and other machines or nodes via networks. In one example, wireless network interface 215 could include a wireless network controller ("WNIC") with suitable transmitting and receiving components, such as transceivers, for wirelessly communicating within a network. Wired network interface 216A can enable machine 210 to physically connect to a network by a wire line such as an Ethernet cable. Both wireless and wired network interfaces 215 and 216A may be configured to facilitate communications using suitable communication protocols such as, for example, Internet Protocol Suite ("TCP/IP"). Machine 210 is shown with both wireless and wired network interfaces 215 and 216A for illustrative purposes only. While one or more wireless and hardwire interfaces may be provided in machine 210, or externally connected to machine 210, only one connection option is needed to enable connection of machine 210 to a network.

A user interface 217 may be provided in some machines to allow a user to interact with the machine 210. User interface 217 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, and an application programming interface (API), etc.

Removable media drive 218 represents a drive configured to receive any type of external computer-readable media (e.g., computer-readable medium 219). Instructions embodying the activities or functions described herein may be stored on one or more external computer-readable media. Additionally, such instructions may also, or alternatively, reside at least partially within a memory element (e.g., in main memory 213 or cache memory of processor 212) of machine 210 during execution, or within a non-volatile memory element (e.g., secondary storage 214) of machine 210. Accordingly, other memory elements of machine 210 also constitute computer-readable media. Thus, "computer-readable medium" is meant to include any medium that is capable of storing instructions for execution by machine 210 that cause the machine to perform any one or more of the activities disclosed herein.

Not shown in FIG. 8 is additional hardware that may be suitably coupled to processor 212 and other components in the form of memory management units ("MMU"), additional symmetric multiprocessing elements, physical memory, peripheral component interconnect ("PCI") bus and corresponding bridges, small computer system interface ("SCSI")/integrated drive electronics ("IDE") elements, etc. Machine 210 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 210 to appropriately manage the operation of the hardware components therein.

The elements, shown and/or described with reference to machine 210, are intended for illustrative purposes and are not meant to imply architectural limitations of machines such as those utilized in accordance with the present disclosure. In addition, each machine may include more or fewer components where appropriate and based on particular needs and may run as virtual machines or virtual appliances. As used herein in this Specification, the term "machine" is meant to encompass any computing device or network element such as servers, virtual servers, logical containers, routers, personal computers, client computers, network appliances, switches, bridges, gateways, processors, load balancers, wireless LAN controllers, firewalls, or any other suitable device, component, element, or object operable to affect or process electronic information in a network environment.

In one example implementation, certain network elements or computing devices may be implemented as physical and/or virtual devices and may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments described and shown herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory can store data used for the various operations described herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of environments illustrated herein may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environments described herein could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that embodiments described herein, as shown in the FIGURES, and teachings thereof are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

In the foregoing description, for purposes of explanation, numerous specific details are set forth in order to provide a thorough understanding of the disclosed embodiments. It will be apparent to one skilled in the art, however, that the disclosed embodiments may be practiced without these specific details. In other instances, structure and devices are shown in block diagram form in order to avoid obscuring the disclosed embodiments. In addition, references in the Specification to "one embodiment", "example embodiment", "an embodiment", "another embodiment", "some embodiments", "various embodiments", "other embodiments", "alternative embodiment", etc. are intended to mean that any features (e.g., elements, structures, modules, components, steps, operations, characteristics, etc.) associated with such embodiments are included in one or more embodiments of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. An apparatus for implementing a Symmetric Multi-Processing ("SMP") system, the apparatus comprising:
   a first server including a first processor electrically connected to a second processor;
   a second server including a third processor electrically connected to a fourth processor;
   a first connection plane, wherein one of the first and second processors is connected to one of the third and fourth processors by a first connection via the first connection plane and one of the first and second processors is connected to one of the third and fourth processors by a second connection via the first connection plane;

a second connection plane, wherein one of the first and second processors is connected to one of the third and fourth processors by a third connection via the second connection plane and wherein one of the first and second processors is connected to one of the third and fourth processors by a fourth connection via the second connection plane;

a first pair of protocol agnostic electrical redrivers connected on the first connection plane; and a second pair of protocol agnostic electrical redrivers connected on the second connection plane, wherein, each of the processors of each one of the servers is connected to each of the processors of the other one of the servers, and at least one of the first connection, the second connection, the third connection, or the forth connection is made via at least one of the first pair of protocol agnostic electrical redrivers or the second pair of protocol agostic electrical redrivers.

2. The apparatus of claim 1, wherein at least one of the first, second, third, and fourth connections comprises a cache-coherent link.

3. The apparatus of claim 1, wherein each of the first, second, third, and fourth connections comprises a cache-coherent link.

4. The apparatus of claim 1, wherein the first connection plane comprises a frontplane and the second connection plane comprises at least one of a midplane and a backplane.

5. The apparatus of claim 1, wherein a first half of the cache-coherent links are connected via the first pair of protocol agnostic electrical redrivers on the first connection plane, and a second half of the cache-coherent links are connected via the second pair of protocol agnostic electrical redrivers on the second connection plane.

6. The apparatus of claim 1, wherein each of the first and second servers comprises a blade server.

7. The apparatus of claim 1, wherein the first connection is disposed between the first and third computers, the second connection is disposed between the first and fourth processors, the third connection is disposed between the second and third processors, and the fourth connection is disposed between the second and fourth processors.

8. The apparatus of claim 1, wherein the first connection is disposed between the first and third computers, the second connection is disposed between the second and fourth processors, the third connection is disposed between the second and third processors, and the fourth connection is disposed between the first and fourth processors.

9. A method for implementing a Symmetric Multi-Processing ("SMP") system, the method comprising:

providing a first server including a first processor electrically connected to a second processor;

providing a second server including a third processor electrically connected to a fourth processor;

providing a first connection plane between the first and second servers;

providing a second connection plane between the first and second servers;

providing a first connection between one of the first and second processors and one of the third and fourth processors via the first connection plane;

providing a second connection between one of the first and second processors and one of the third and fourth processors via the first connection plane;

providing a third connection between one of the first and second processors and one of the third and fourth processors via the second connection plane;

providing a fourth connection between one of the first and second processors and one of the third and fourth processors via the second connection plane;

providing a first pair of protocol agnostic electrical redrivers connected on the first connection plane; and providing a second pair of protocol agnostic electrical redrivers connected on the second connection plane, wherein, each of the processors of each one of the servers is connected to each of the processors of the other one of the servers, and at least one of the first connection, the second connection, the third connection, or the forth connection is made via at least one of the first pair of protocol agnostic electrical redrivers or the second pair of protocol agnostic electrical redrivers.

10. The method of claim 9, wherein at least one of the first, second, third, and fourth connections comprises a cache-coherent link.

11. The method of claim 9, wherein each of the first, second, third, and fourth connections comprises a cache-coherent link.

12. The method of claim 9, wherein the first connection plane comprises a frontplane and the second connection plane comprises at least one of a midplane and a backplane.

13. The method of claim 9, wherein a first half of a plurality of cache-coherent links are connected via the first pair of protocol agnostic electrical redrivers on the first connection plane, and a second half of the cache-coherent links are connected via or the second pair of protocol agnostic electrical redrivers.

14. The method of claim 9, wherein each of the first and second servers comprises a blade server.

15. The method of claim 9, wherein the first connection is disposed between the first and third computers, the second connection is disposed between the first and fourth processors, the third connection is disposed between the second and third processors, and the fourth connection is disposed between the second and fourth processors.

16. The method of claim 9, wherein the first connection is disposed between the first and third computers, the second connection is disposed between the second and fourth processors, the third connection is disposed between the second and third processors, and the fourth connection is disposed between the first and fourth processors.

* * * * *